United States Patent [19]

Futer

[11] 4,378,182
[45] Mar. 29, 1983

[54] PACKAGE COLLATOR WITH ACCELERATING BOOSTER

[76] Inventor: Rudolph E. Futer, 2027 B Otis Dr., Alameda, Calif. 94501

[21] Appl. No.: 907,451

[22] Filed: May 22, 1978

[51] Int. Cl.³ .............................................. B65G 51/02
[52] U.S. Cl. ...................................... 406/10; 406/88; 406/183
[58] Field of Search ........................... 302/2 R, 29, 31; 53/500, 501; 221/2, 7, 12; 198/420, 425, 460, 503; 406/10, 28, 31, 88, 89, 181–183

[56] References Cited

U.S. PATENT DOCUMENTS

| | | | |
|---|---|---|---|
| 3,730,386 | 5/1973 | Monsees | 221/7 |
| 3,822,006 | 7/1974 | Shuttleworth | 198/503 X |
| 3,873,163 | 3/1975 | Gladish | 302/31 |
| 3,890,011 | 6/1975 | Futer | 302/31 |
| 3,980,024 | 9/1976 | Futer | 302/31 X |

FOREIGN PATENT DOCUMENTS 1011965 12/1965 United Kingdom .

*Primary Examiner*—Jeffrey V. Nase
*Attorney, Agent, or Firm*—James R. Cypher

[57] ABSTRACT

A device including a storage area for holding objects on one or a plurality of tracks; an air conveyor for constantly urging the objects along the tracks; a gate holding the objects from proceeding forwardly and intermittently opening to permit a selected number of objects to move forwardly, a booster for accelerating one object at a time in each of the tracks; a counting device and transporting conveyors mounted downstream of the gate for carrying the objects forwardly.

7 Claims, 29 Drawing Figures

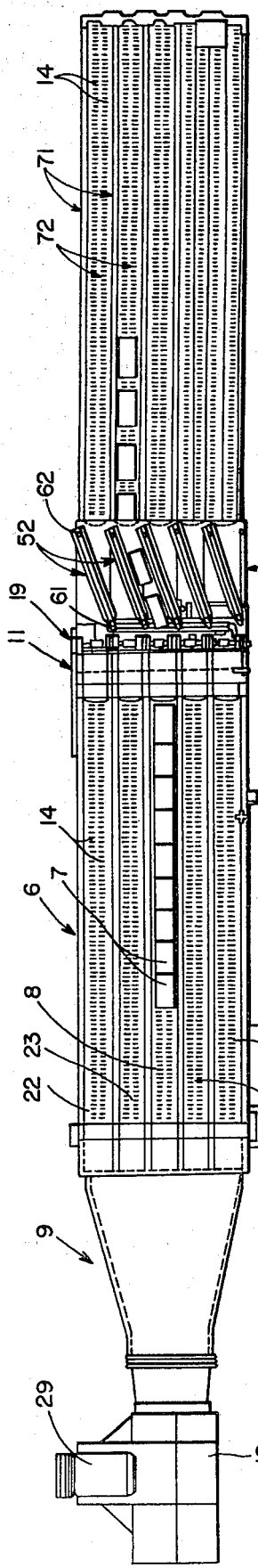

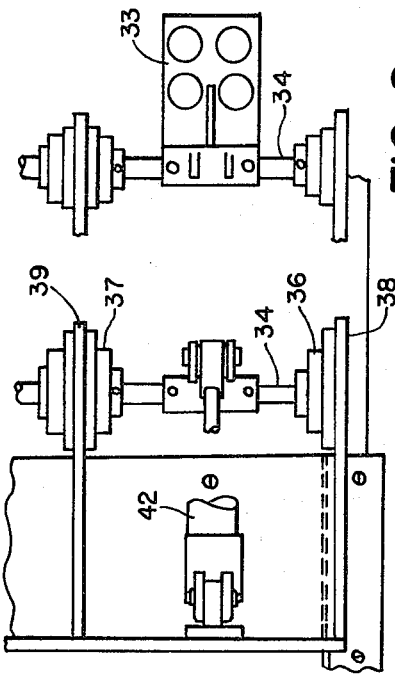
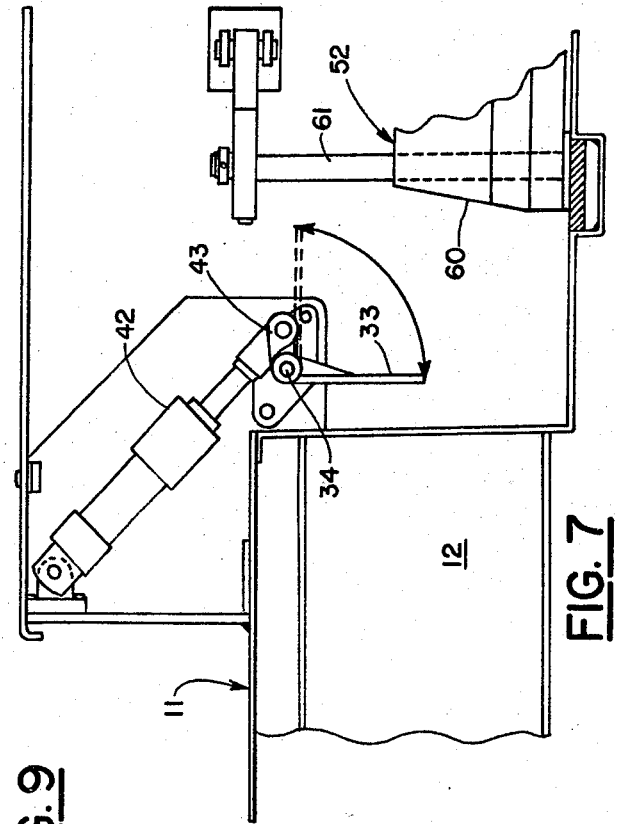
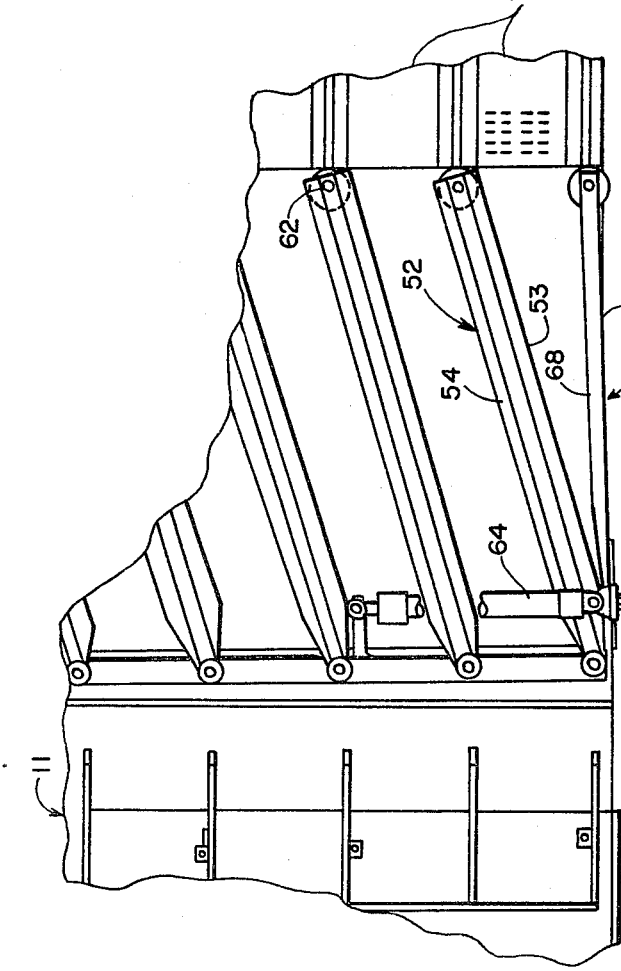
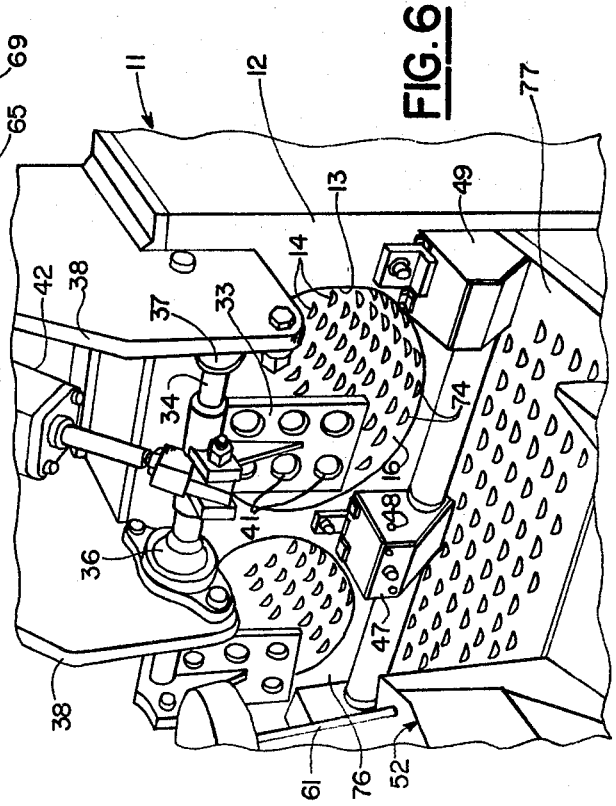

PACKAGE COLLATOR WITH ACCELERATING BOOSTER

BACKGROUND

In numerous assembly line operations, a plurality of objects are held in temporary storage on tracks prior to packaging into cartons. For example, paper towels wrapped in flexible packaging containers are lined up end to end in abutting relationship prior to packaging in large cardboard cartons. Standard devices for placing the towels in the cartons were satisfactory until manufacturers began offering different color towels. At first, the cartons were filled with towels having the same color and then repackaged by hand to obtain the selected color mix.

The first machines developed consisted of tracks with moving belts to provide the "live" storage of the towels. An arm pressed down upon the top of the towels to hold them until a control device signaled the arm to rise sufficiently to permit one or more towels to move forwardly.

Two problems were encountered; the flexible packaging around the towels became scuffed or torn by the moving belts while they were being held by the pressing arm, and counting control was not sufficiently accurate due to the inherent difficulty the mechanism had in "counting" the number of packages passing beneath the pressing arm while it was in the raised position. The difficulty lay in the fact that no device proved satisfactory in detecting the beginning of one package and the end of the preceeding package.

The use of air supporting and transporting mechanisms to convey the towel packages solved the scuffing problem caused by conveyor belts, but the problem of "counting" the packages was still unsolved.

SUMMARY OF THE INVENTION

The gist of the present invention is the use of a booster element in the conveying system which accelerates each package individually as it passes through the booster and causes a space to occur between the abutting packages so that a counting mechanism such as an electric eye can sense the space between the packages.

An object of the present invention is to provide a device which can transport objects quickly and economically without harming the flexible packaging protecting the object.

A further object is to provide a device which can count and transport a selected number of packages of different colors from a live storage area to a carton packaging area.

Still another object is to provide a device which can be programmed to deliver different selected numbers of differently coded objects to a carton packaging station.

A still further object is to to provide a device which can select and transport the required number of objects from a live storage area to the carton packaging station within a short time period so that there is no delay in the carton packaging operation.

BRIEF DESCRIPTION OF THE DRAWINGS

FIG. 1 is a side view of the device of the present invention.

FIG. 2 is a top plan view of the device of FIG. 1.

FIG. 3 is a cross section of a portion of the device taken along line 3—3.

FIG. 4 is a cross section of a portion of the device taken along line 4—4.

FIG. 5 is a top plan view of a modified form of the diverters shown in FIG. 2.

FIG. 6 is a perspective view of a portion of the gate system of the device.

FIG. 7 is a side view of a gate shown in FIG. 6 and a portion of the diverter mechanism.

FIG. 8 is a top view of the gate shown in FIG. 7 with the left portion of the drawing showing the gate in the closed position and the right portion showing the gate in the open position.

FIG. 9 is a top plan view of a portion of the device showing the diverter mechanism.

DESCRIPTION

First Embodiment

Figure 10:
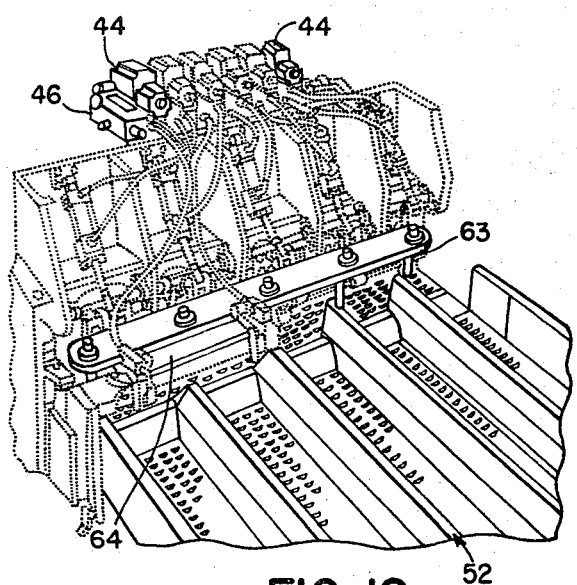
FIG. 10 is a perspective view of a portion of the device showing the gates and diverter part of the mechanism.
Figure 11:
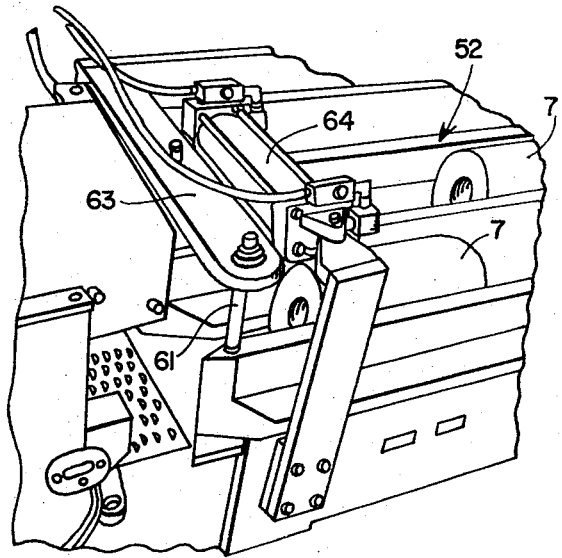
FIG. 11 is a perspective view of a portion of the device illustrating two towel packages moving through the diverter portion of the mechanism.
Figure 19:
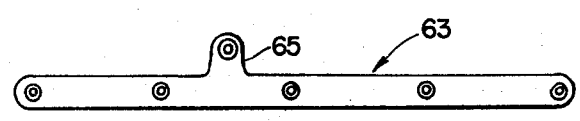
FIG. 19 is a top plan view of the connector bar for the movable diverter arms.
Figure 12:
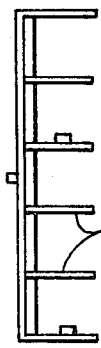
FIG. 12 is a top plan view of the mounting assembly for the gate operating mechanism.
Figure 16:
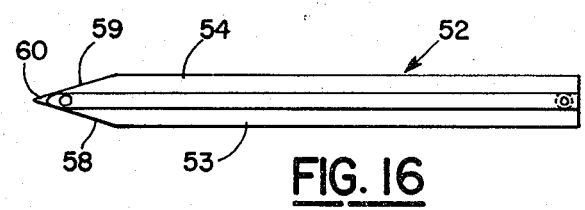
FIG. 16 is a top plan view of the diverter arm of FIG. 14.
Figure 13:
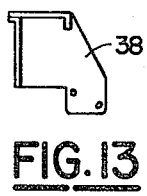
FIG. 13 is a side view of the mounting assembly of FIG. 12.
Figure 14:
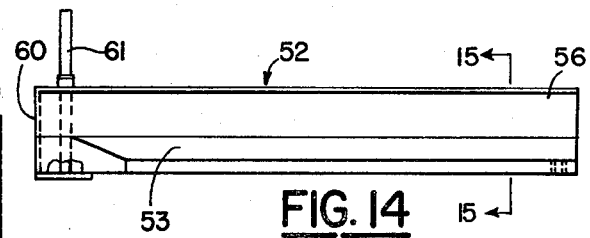
FIG. 14 is a side view of a diverter arm.

In its most basic form, the present invention is a device for accelerating and transporting a plurality of initially abutting objects such as paper towels or rolls of toilet paper. The device consists of means 6 supporting the objects 7 in end to end relationship on an open trough elongated track 8. A driving means 9 is provided to urge the objects constantly in a forward direction into end to end abutting relationship as shown in FIGS. 1 and 2. A booster means 11 receives the objects and individually accelerates each of them from the abutting relationship to a spaced relationship. The booster means includes a housing 12, a passage 13 formed in the housing having a cross sectional shape similar to the cross sectional shape of the objects and slightly larger, a length approximately the length of the objects and a plurality of Coanda-effect directional slit orifices 14 formed in the walls 16 of the passage which are aligned to propel the objects forwardly. A fan or blower means 18 communicates with the orifices in the booster and supplies the moving air thereto. The same fan 18 may also be used in the previously described driving means 9 provided the booster and driving means are separately ducted.

The Coanda-effect directional slit orifices are similar to the orifices described in my U.S. Pat. No. 3,980,024 granted Sept. 14, 1976.

Several forms of driving means may be employed to urge the objects forwardly toward the booster. A very steeply inclined track using the forces of gravity only could be used. Preferably, however, an open trough using the same Coanda-effect directional slit orifices 14 as used in the booster is used to lift and propel the objects forwardly.

Second embodiment

The second embodiment is similar to the first embodiment except that a gate means 19 is added for holding the objects in abutting relationship. The gate means is controlled by a control means 21 which opens and closes the gate to permit intermittant passage of a selected number of objects.

Third embodiment

The third embodiment arose out of a need to collate different color paper towels or different color rolls of toilet paper and transport the correct number of each color to a carton packaging station.

Figures 21, 22, 24:
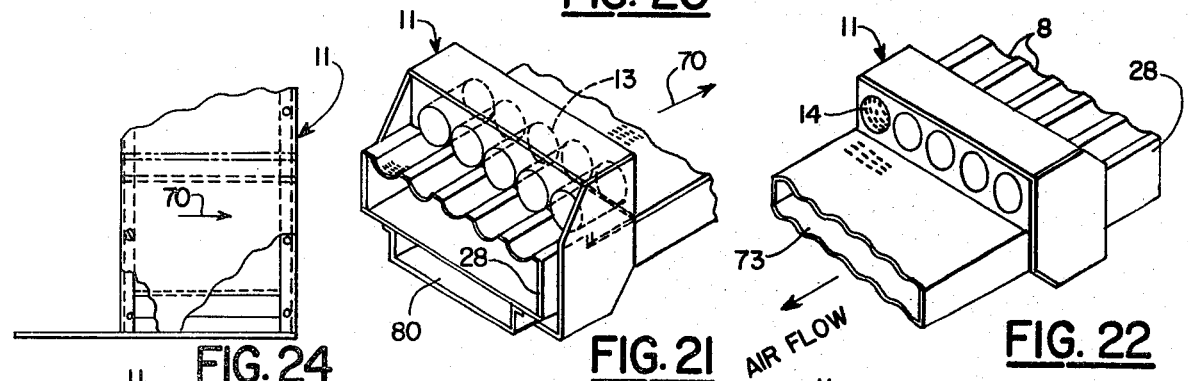
FIG. 21 is a perspective view of a portion of the booster element with portions shown in cross section.
FIG. 22 is a perspective view of a portion of the booster element as shown in FIG. 21.
FIG. 24 is a top view of the portion of the booster element shown in FIG. 23.

The means 6 for supporting the objects 7 includes a plurality of tracks placed side by side. In the device illustrated, five tracks 8, 22, 23, 24 and 25 are used. As shown in FIGS. 21 and 22, each track consists of a shallow semi-circular trough 27 in which Coanda-effect directional slit orifices 14 are formed. These orifices are the same as the orifices formed in the booster. Air is supplied to the orifices through a plenum chamber 28. An electric motor 29 drives a fan or blower 18 which forces air through conduit 31. The air moving through the directional orifices provides a driving means to urge all of the objects constantly in a forward direction.

The gate means is best illustrated in FIGS. 6, 7 and 8. A gate means is mounted on each booster passage. The gate may consist of a member 33 mounted for pivotal movement on a spindle 34 connected to journals 36 and 37 which are connected to frame members 38. Openings 41 in the gate member lighten the weight of the gate and permit the passage of air therethrough. The gate is moved by an air ram 42 connected to a crank arm 43. A solenoid 44 operates an air valve 46 to operate the ram 42. The gate means for each booster are identical and only one set of apparatus is numbered and described.

In the apparatus illustrated, 5 separate booster passages with Coanda-effect directional slit orifices are provided.

Each gate is independently controlled by a control means 21. One form of control means includes a photo cell assembly 47 including a light source 48 and a photo sensitive receiver 49 mounted downstream of the gate 33. When a gap occurs between the objects, the light from the light source can reach the receiver. When the object passes in front of the light source, the beam is cut off and no light reaches the receiver. The receiver transmits a signal to a computer when it is receiving or not receiving light. The computer can be programmed to actuate the gate solenoids and open and close the gate 33 to permit a selected number of objects pass each booster.

When it is desirable to change the numbers of each colored objects in a carton, the computer can be programmed to permit different numbers of objects to pass through each gate. Where it is desirable to change the number of objects to be received by each track on the downstream side of the booster, a diverter means may be provided. The diverter means is illustrated in FIGS. 6-18. The diverters consist of members 52 having shoulders 53 and 54 and upstanding walls 56 and 57. The front portions 58 and 59 are tapered and come to a blunt point 60. The front portion is connected to a swing arm 61 and the rear portion is connected to a pivot pin 62.

Figures 17, 18:
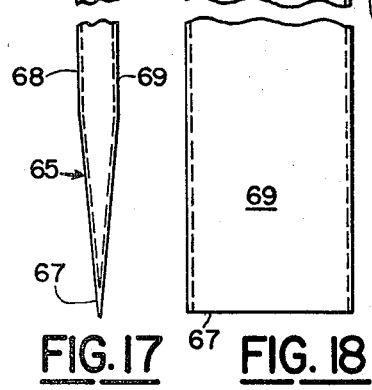
FIG. 17 is a top plan view of a stationary diverter arm.
FIG. 18 is a side view of the arm of FIG. 17.
Figure 15:
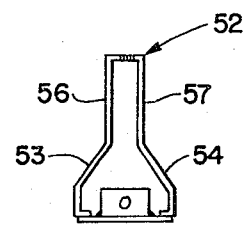
FIG. 15 is a cross section of the diverter arm taken along line 15—15 of FIG. 14.
Figure 20:
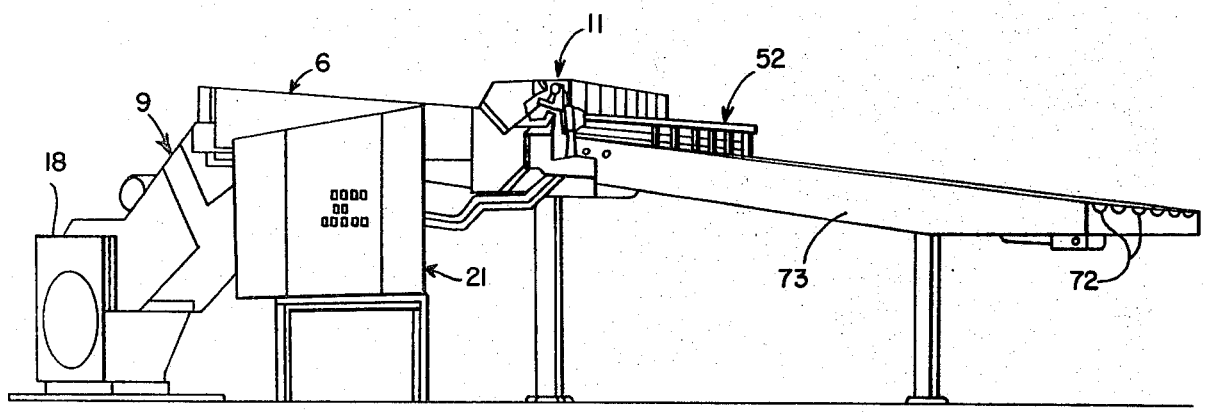
FIG. 20 is an oblique side view of the device shown in FIG. 1.

A control arm 63 is connected to each swing pin and the entire control arm is moved by a ram 64 connected to crank arm 65. FIGS. 17 and 18 illustrate a stationary diverter which consists of a tapered end 67 and elongated walls 68 and 69.

Figure 23:
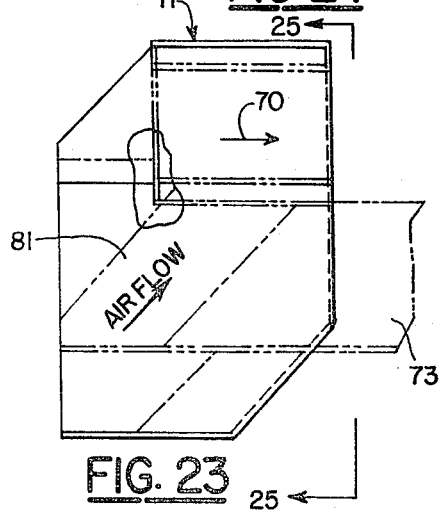
FIG. 23 is a side view of a portion of the booster element.
Figure 25:
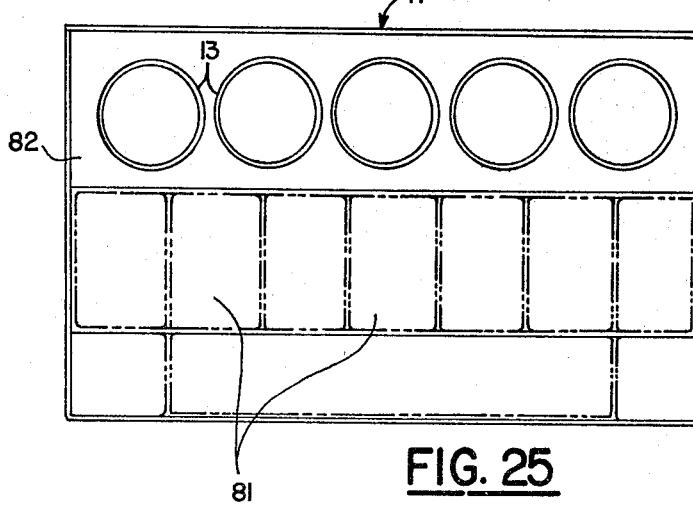
FIG. 25 is a front elevation view of the booster shown in FIG. 23 taken along line 25—25.
Figure 27:
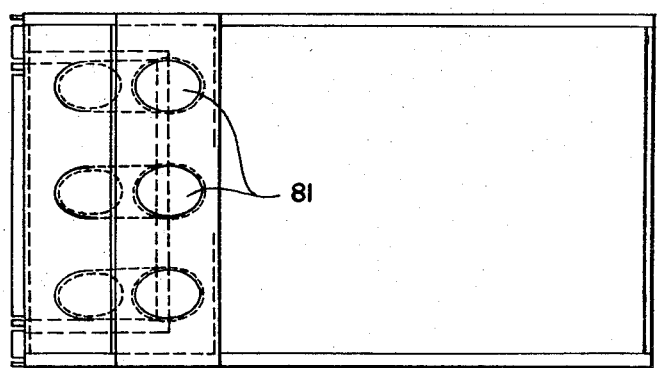
FIG. 27 is a top plan view of the lower plenum shown in FIG. 26.
Figure 28:
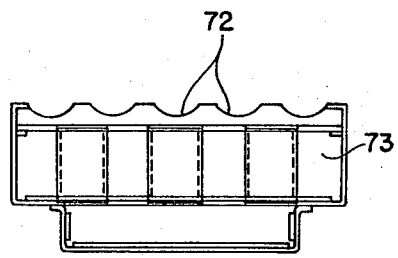
FIG. 28 is an end elevation view of the lower plenum shown in FIG. 26.
Figure 26:
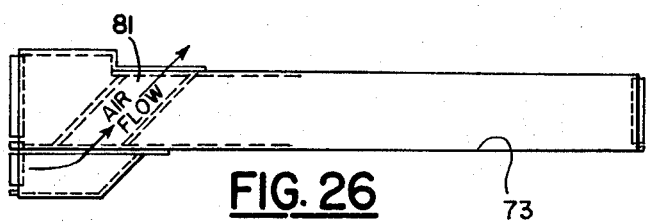
FIG. 26 is a side elevation view of the lower plenum.
Figure 29:
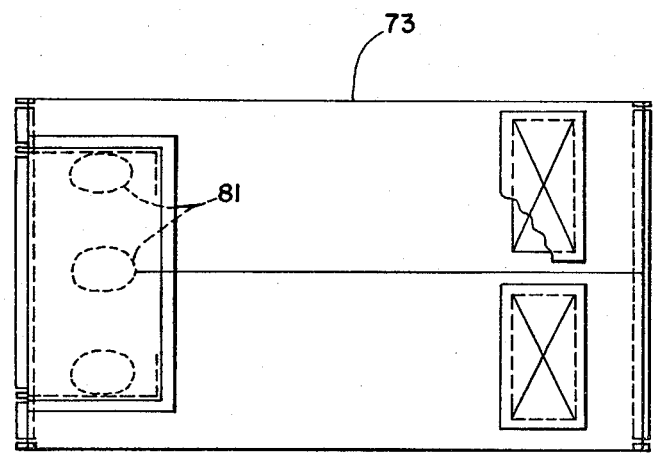
FIG. 29 is a bottom plan view of the lower plenum shown in FIG. 26.

The objects move past the diverters to downstream tracks 71 which are similar in construction to the upstream tracks previously described. Shallow troughs 72 formed with directional slit Coanda-effect orifices 14 are preferably used. Air for the orifices is supplied by fan 18 which is supplied through plenum chamber 73. The objects move in the direction shown by arrow 70 in FIGS. 21, 23 and 24.

The construction of the booster as may be seen in FIG. 6 shows the slit orifices arranged in aligned substantially straight rows 74 in the direction of travel of the objects. The rows of orifices each have a length substantially the length of the booster housing. There are a sufficient number of rows of orifices to extend substantially around the entire inside walls of the booster.

As illustrated in FIG. 6, there may be a step 76 or drop in elevation immediately after the objects leave the booster. A plate 77 with directional slit orifices is provided to assist in the transporting of the object away from the booster and through the diverter members 52. By providing the step, the object is kept airborn for a short distance so that the high speed imparted by the booster may be maintained.

Air is supplied to the slit orifices in the booster by means of conduit 79, plenum 80, conduits 81 and manifold 82.

The collator of the present invention is capable of furnishing the correct number of paper towels of each of five different colors so that a case of 30 towels can be packed in under 4 seconds.

At the present time, packing machines require the same number of packages in each lane. The diverter system as above described permits greater flexibility in selecting different numbers of each color for each carton.

It has been found that an air pressure of about 9 inches of water gauge in the booster and an air pressure of about 4 inches water gauge in the upstream and downstream tracks is an operating differential which works properly for paper towels. Different air pressures for different objects would of course be required.

As may be understood, the booster need not be circular in configuration. Square configurations could be used for packages which are square in cross section.

FIG. 5 illustrates a different arrangement of diverters which can be used with the device. Movable diverters 52' are similar in structure to the diverters previously described and illustrated in FIG. 2. A stationary diverter 65' is similar in structure to diverter 65 shown in FIG. 2.

I claim:

1. A device for separating, counting and transporting a plurality of initially abutting objects comprising:
    a. feed means supporting said objects in end-to-end touching relationship on an open trough elongated track;
    b. feed driving means operatively connected to said feed means urging said objects on said feed means constantly in a forward direction into end-to-end abutting relationship and intermittently accelerating all of said objects and maintaining said end-to-end relationship;
    c. booster means mounted adjacent said feed supporting means and receiving said objects and individually accelerating each of said objects from said abutting relationship to a spaced relationship, said booster means including a housing, a passage having an inlet and an outlet formed in said housing and said passage having a cross sectional shape similar to said cross sectional shape of said objects and slightly larger and a length approximately the length of one of said objects, a plurality of Coanda-effect directional slit orifices formed in the walls of said passage aligned to accelerate and propel said objects forwardly, so as to always create a gap of defined length between each of said objects and said slit orifices are arranged in aligned substantially straight rows in said passage in the direction of travel of said objects, said rows of orifices each having a length substantially the length of said passage, said rows of orifices extend substantially around the entire inside walls of said passage;
    d. gate means mounted adjacent said booster passage outlet for holding said objects in abutting relationship and operable to permit intermittant passage of a selected number of said objects;
    e. gate opening and closing control means connected to said gate including a photo cell assembly mounted adjacent said gate means for sensing said gap between said objects to count the objects, said control means closes said gate means upon the sensing of a selected number of objects passing the photo cell assembly;
    f. powered blower means communicating with said booster orifices and supplying moving air thereto with a force selected to accelerate said objects at a rate substantially faster than said feed driving means accelerates said objects, thereby creating said gap between each of said objects as said objects pass said gate; and
    g. a downstream track open to ambient air mounted downstream from said gate means and maintaining said objects in an aligned row.

2. A device as described in claim 1 comprising:
    a. said feed means supporting said objects includes a plurality of tracks placed side by side;
    b. said feed driving means urges all of said objects on all of said tracks constantly in a forward direction;
    c. said gate means includes a separate gate adjacent each of said booster passages;
    d. said booster means includes a plurality of passages;
    e. said control means is operatively connected to all of said gates;
    f. diverter means downstream of each of said gates for changing the direction of said objects after leaving one or more of said gates; and
    g. downstream tracks mounted downstream from said diverter means for receiving said objects and maintaining said objects in aligned rows.

3. A device as described in claim 2 comprising:
    a. said control means includes a plurality of photo cell assemblies with one photo cell mounted downstream of each of said gate means; and
    b. said control means further includes a computer means operatively connected to said photo cells and to said gate means for counting said objects and permitting a selected number of objects to pass each gate for each programmed sequence.

4. A device as described in claim 3 comprising:
    a. said feed means supporting said objects includes a plurality of shallow open troughs each formed with a plurality of Coanda-effect directional orifices; and
    b. said feed driving means supplies moving air to said feed means orifices at a pressure less than the pressure supplied by said blower means connected to said booster orifices.

5. A device as described in claim 4 comprising:
    a. said downstream tracks include shallow troughs each formed with a plurality of Coanda-effect directional orifices; and
    b. downstream driving means communicating with said orifices in said downstream tracks and supplying moving air thereto.

6. A device as described in claim 5 comprising:
    a. said diverter means include elongated guide members mounted on pivots and for selectively diverting said objects from one of said downstream tracks to another, and a substantially planar member formed with a plurality of Coanda-effect directional orifices;
    b. control means for pivoting said diverter elongated members causing said objects to move from one track to an adjacent track; and
    c. diverter driving means including blower driven air communicating with said orifices in said planar member.

7. A device as described in claim 5 comprising:
    a. said trough of said downstream tracks are positioned at a lower elevation relative to the lowermost portion of said booster housing passage permitting a measurable free fall of said object upon exiting said booster housing.

* * * * *